Figure 1:
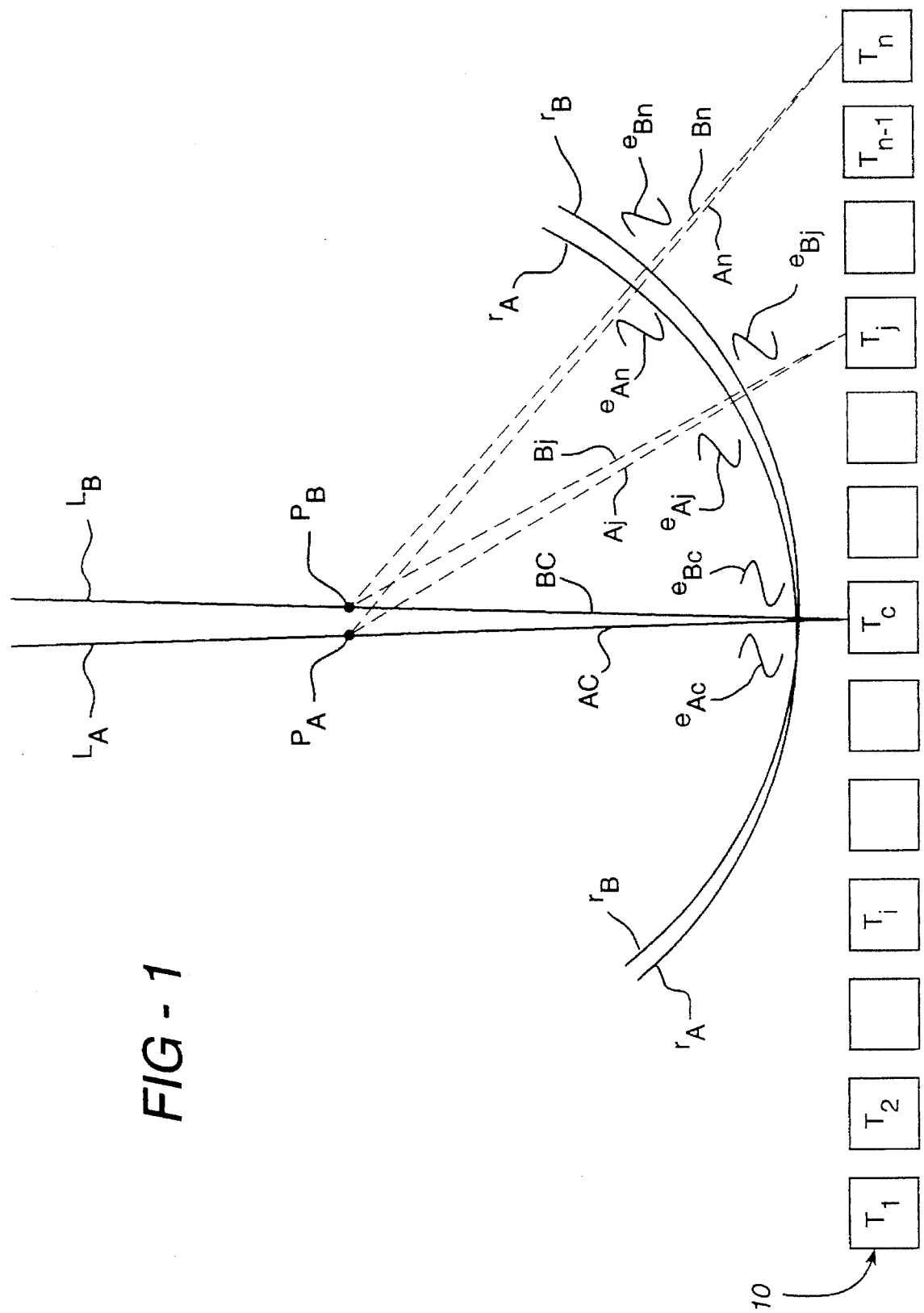

US005544655A

United States Patent [19]

Daigle

[11] Patent Number: 5,544,655

[45] Date of Patent: Aug. 13, 1996

[54] ULTRASONIC MULTILINE BEAMFORMING WITH INTERLEAVED SAMPLING

[75] Inventor: Ronald E. Daigle, Redmond, Wash.

[73] Assignee: Atlantis Diagnostics International, LLC, Bothell, Wash.

[21] Appl. No.: 307,124

[22] Filed: Sep. 16, 1994

[51] Int. Cl.[6] .................................................. A61B 8/00
[52] U.S. Cl. ..................................... 128/661.010; 73/625
[58] Field of Search .................... 128/660.070, 661.010; 73/625–626; 365/189.02

[56] References Cited

U.S. PATENT DOCUMENTS

| | | | |
|---|---|---|---|
| 3,356,989 | 12/1967 | Autrey | 340/6 |
| 3,936,791 | 2/1976 | Kossoff | 367/138 |
| 4,058,003 | 11/1977 | Macovski | 73/609 |
| 4,173,007 | 10/1979 | McKeighen et al. | 367/11 |
| 4,561,308 | 12/1985 | Bele et al. | 73/626 |
| 4,622,634 | 11/1986 | Fidel | 128/661.010 X |
| 4,644,795 | 2/1987 | Augustine | 73/625 |
| 4,742,830 | 5/1988 | Tamano et al. | 128/661.090 |
| 4,790,320 | 12/1988 | Perten et al. | 128/661.010 |
| 4,893,283 | 1/1990 | Pesque | 128/661.010 X |
| 5,027,821 | 7/1991 | Hirama et al. | 128/661.010 |
| 5,123,415 | 6/1992 | Daigle | 128/661.010 |
| 5,231,573 | 7/1993 | Takamizawa | 364/413.25 |
| 5,329,930 | 7/1994 | Thomas, III et al. | 128/660.070 X |
| 5,345,426 | 9/1994 | Lipschutz | 128/661.010 X |
| 5,351,690 | 10/1994 | Okada et al. | 128/661.010 |
| 5,369,624 | 11/1994 | Fukukita et al. | 367/103 |
| 5,419,330 | 5/1995 | Nishigaki et al. | |

OTHER PUBLICATIONS

"An Ultrasonic Annular Array Based on Quadrature Sampling", by Jeffry Earl Powers (University of Washington, 1980), pp. 80–92.

Primary Examiner—Francis Jaworski
Attorney, Agent, or Firm—W. Brinton Yorks, Jr.

[57] ABSTRACT

An array of ultrasonic transducer elements receives signals to form beams simultaneously from a plurality of beam directions. The echo signals received by each transducer element are sampled in response to two or more interleaved sampling signal sequences, each of which is timed to begin at the initial time of arrival of echo signals from a unique spatial line. Each sampling signal sequence thereby produces signal samples associated with a given line. The stream of interleaved signal samples from each transducer element are separated in correspondence with each sampling signal sequence, and signal samples from corresponding separated sequences from the transducer elements are summed to form coherent signals corresponding to spatially separate ultrasonic beams.

25 Claims, 5 Drawing Sheets

ULTRASONIC MULTILINE BEAMFORMING WITH INTERLEAVED SAMPLING

This invention relates to improvements in ultrasonic diagnostic scanning techniques, and in particular to the scanning Of an ultrasonic image field by which multiple vectors of ultrasonic information are simultaneously acquired through interleaved sampling of the ultrasonic echo signals.

The conventional technique for scanning an image field ultrasonically, either for image (B mode) data or Doppler data, is to transmit a pulse of acoustic energy, then receive ultrasonic echoes from the direction in which the energy was transmitted. This single line technique results in highly accurate echo information, as the transmitted and received energy can be focused on the single line of transmission and reception.

The single line technique has a serious drawback, which is the resulting image frame rate. An image frame is not available for display until all lines in the image have been scanned and the line information assembled into a frame for display. Hence, the time required to assemble an image frame is not less than the round trip transit time of acoustic energy along one line, multiplied by the number of lines. When an image of complex information is utilized, such as a B mode image overlaid with color flow Doppler information, the time required to assemble one image frame of information can be substantial, and the frame rate of display correspondingly low.

This degradation of the frame rate has led to the desire to acquire information for a number of lines from a single ultrasonic transmission. If two lines of information could be acquired from one ultrasonic transmission, for instance, the frame rate could be doubled. But this increase in frame rate is preferably gained without a corresponding decline in image quality. One concern has been the resolution decline believed to be inherent when a transmitted acoustic beam is defocused and broadened to spatially scan two image lines at once. However, a practical solution to this problem has been provided in U.S. Pat. No. 4,644,795 (Augustine), in which the transmit beam is given a substantially flat mainlobe response through sinx/x weighting of the transmit aperture.

Other significant concerns arise when reception of multiple beams is considered. Multiline reception is conventionally believed to involve a substantial increase in the cost and complexity of the receive circuitry of the beamformer. Furthermore, it can be difficult to maintain the focus of two simultaneously received signals. In addition, the reception of simultaneous multiple lines is thought to require very high speed circuitry beyond the capability of current technology. All of these considerations have inhibited widespread commercial use of practical multiline beamforming systems.

In accordance with the principles of the present invention, a multiline beamformer is provided in which the information for multiple scan lines is acquired in an interleaved data sequence. The inventive beamformer controls the timing of sampling of received echo information signals through recognition of the relative phasing of the received signals to develop a sequence of signal samples which are alternately used to form two or more vector lines of ultrasonic data simultaneously. Through the controlled timing of signal sampling and accumulation of associated signal samples, a beam of received echo information is formed without the use of delay lines or other delay structures. Variation of the signal sampling intervals during reception enables the beam to be continually focused at the depth from which the echoes are being received. The signal paths of the interleaved signal samples are no more complex than those of single line beamformers. The inventive beamformer permits multiline beamforming with little increase in cost or complexity as compared with conventional single line beamformers.

Figure 2:
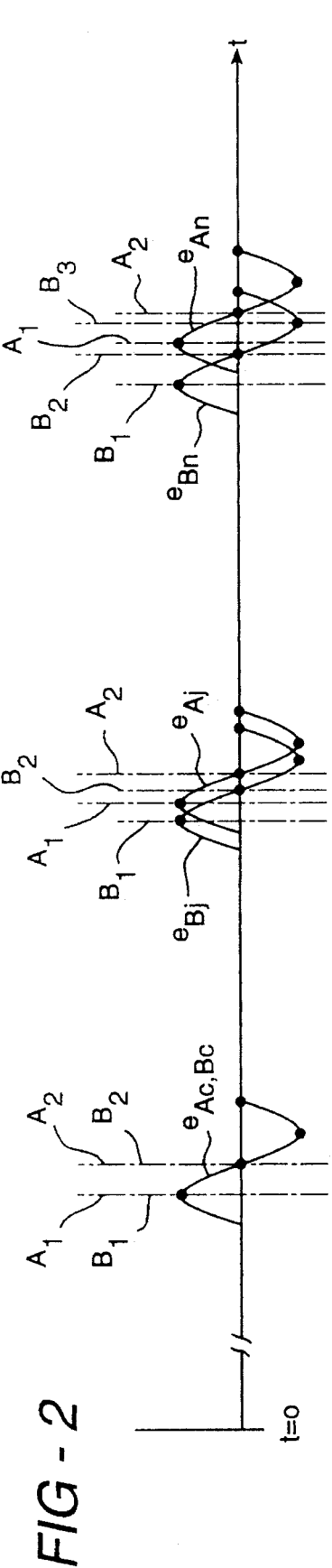
Figure 3A:
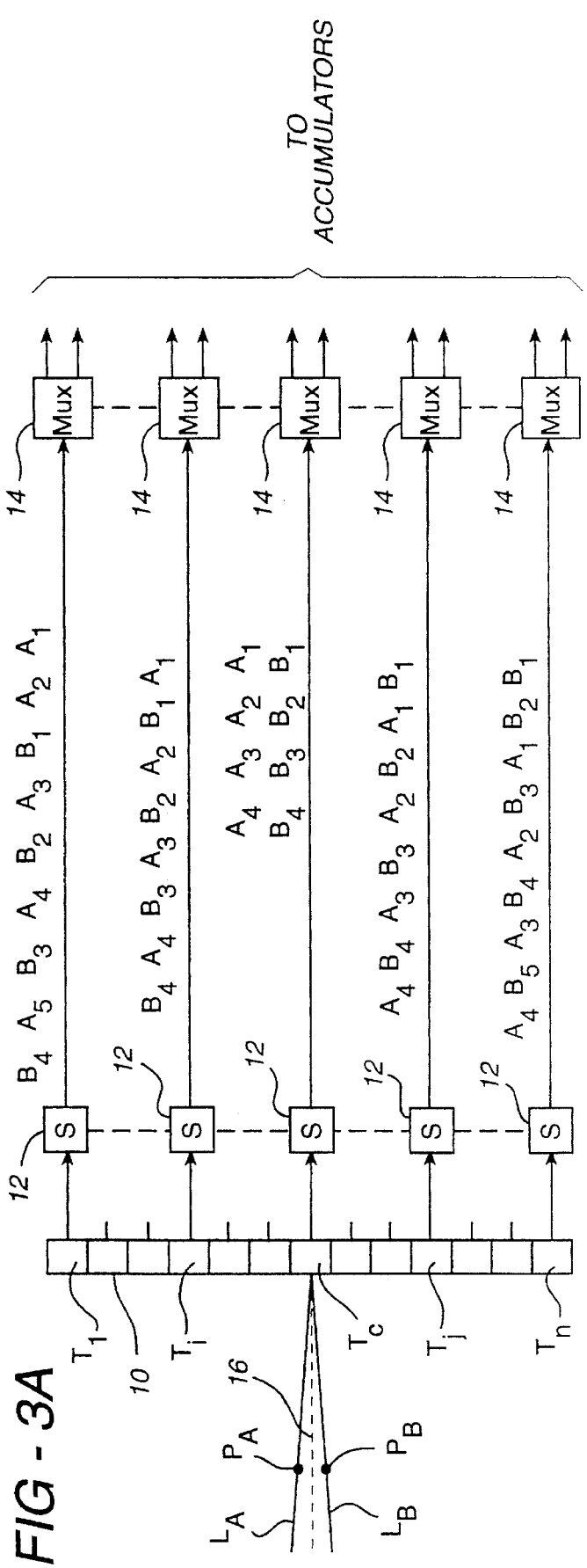
Figure 3B:
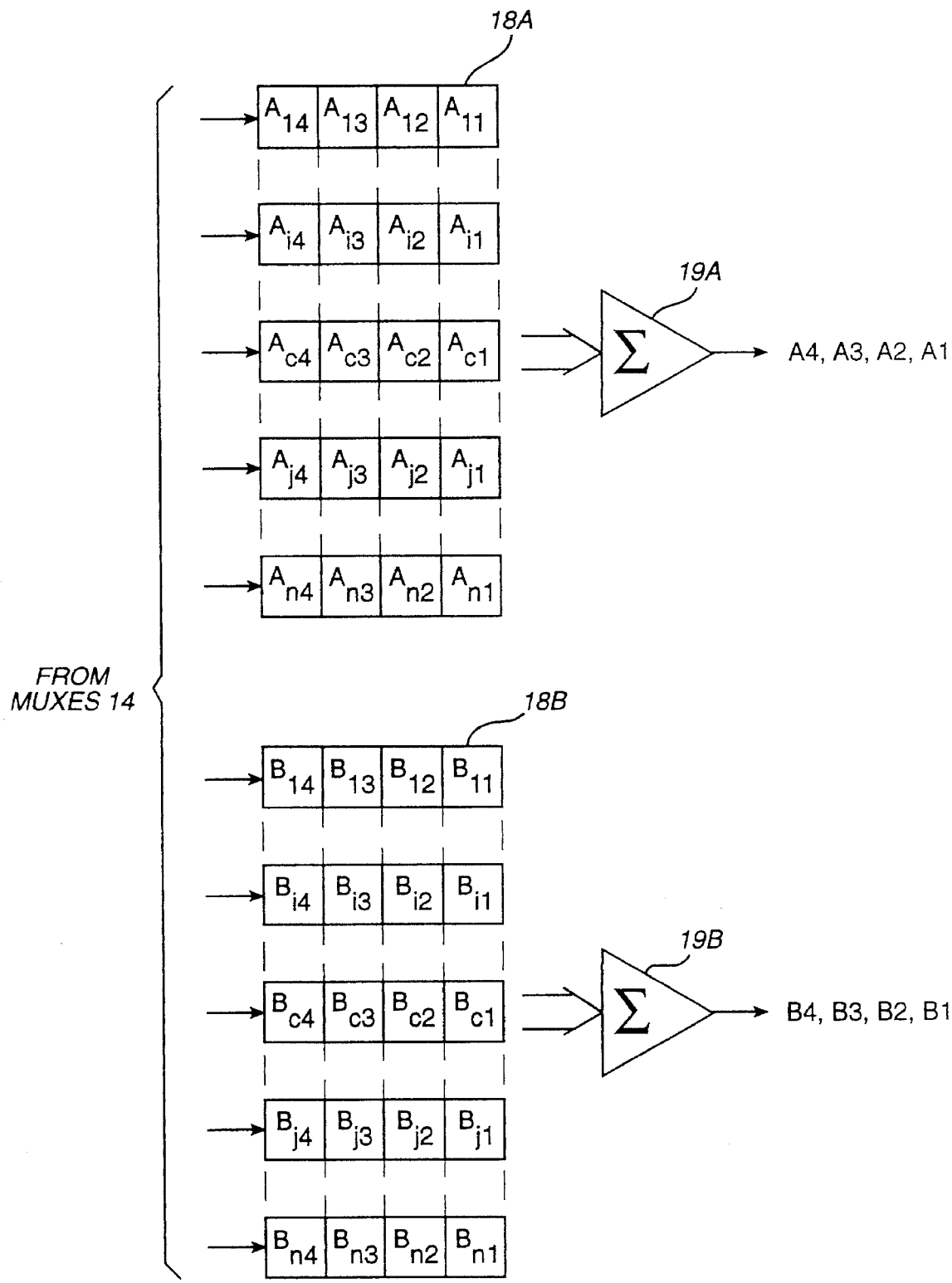
Figure 4:
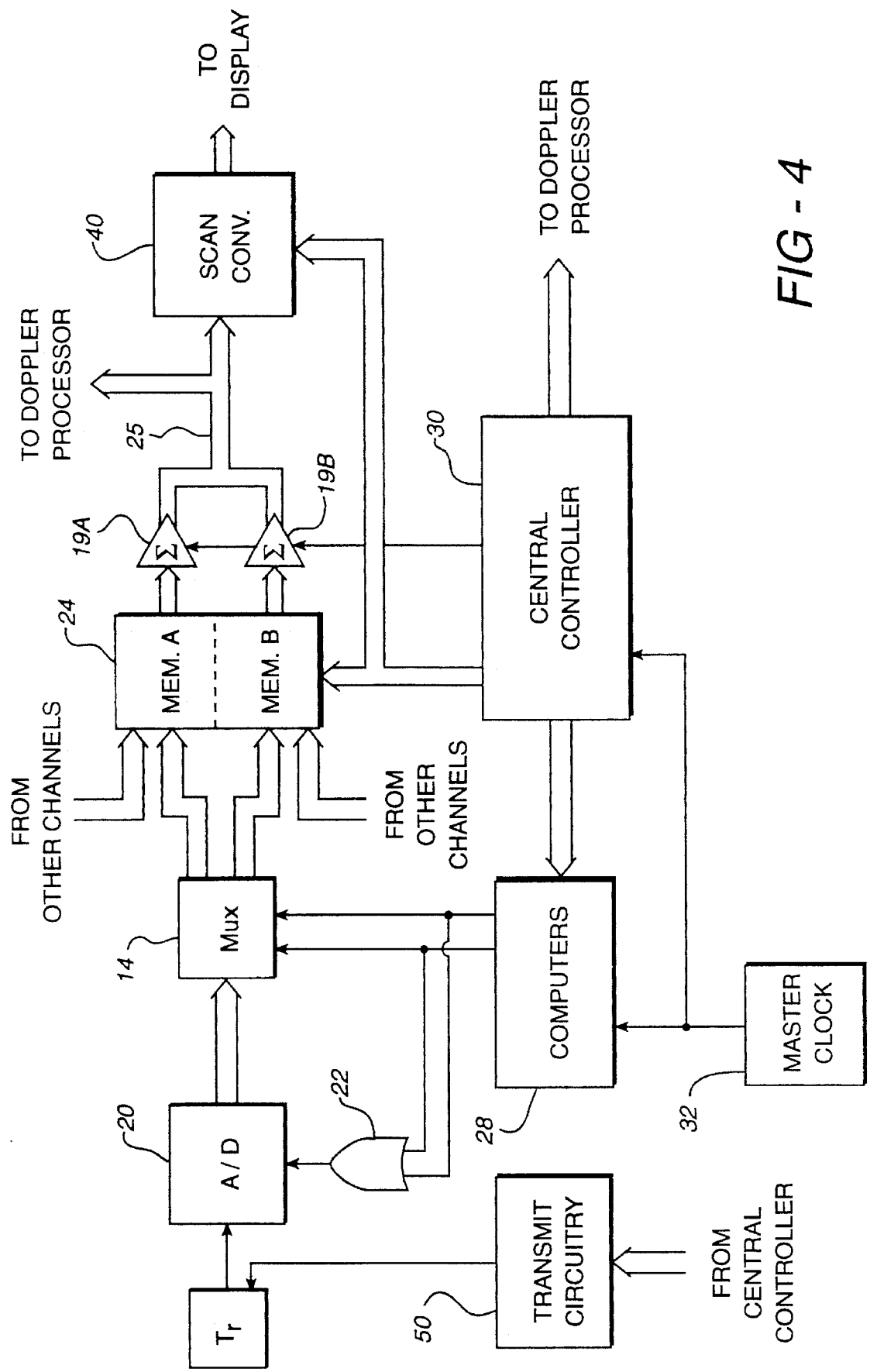
Figure 5A:
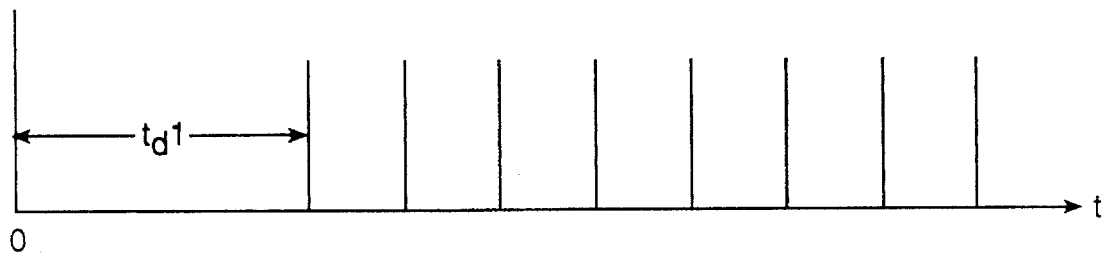
Figure 5B:
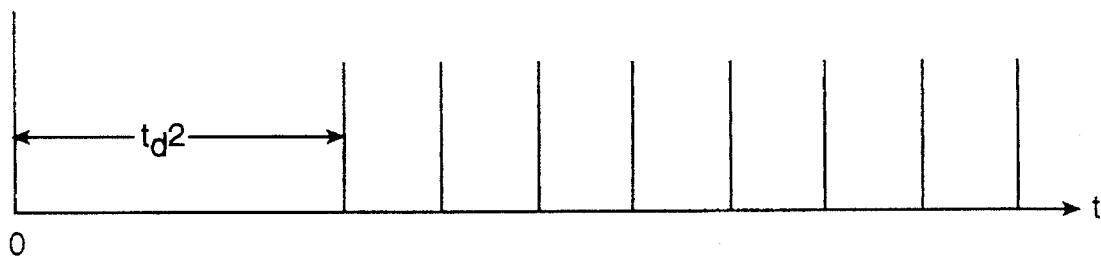
Figure 5C:
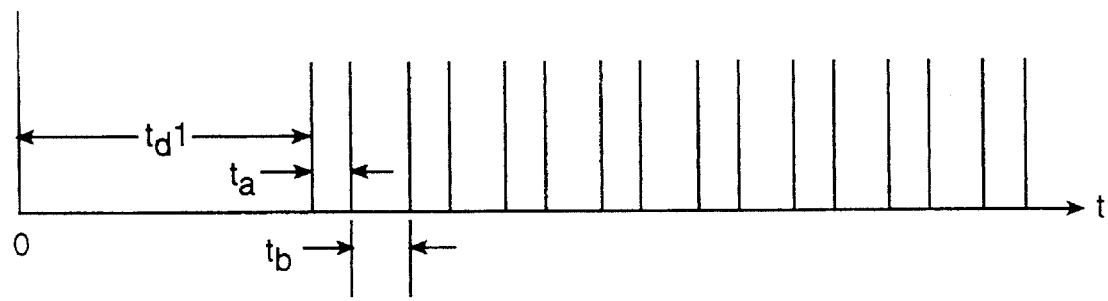

In the drawings:

FIG. 1 spatially illustrates the reception of ultrasonic echo information from points on multiple adjacent scan lines;

FIG. 2 illustrates the relative phasing of the echo signals of FIG. 1;

FIGS. 3a and 3b schematically illustrate the beamforming of interleaved echo signal samples in accordance with the principles of the present invention;

FIG. 4 is a block diagram of one channel of a digital beamformer constructed in accordance with the principles of the present invention; and FIGS. 5a–5c illustrate sampling times used in the explanation of the operation of the embodiment of FIG. 4.

A beamformer is used to control an array of transmitters or receivers and is characterized generally by two properties: the abilities to focus and to steer a beam. These properties are utilized when transmitting an acoustic beam and when receiving returns, or echoes, resulting from the transmission of a beam. Transmit beam focusing and steering is determined by the timed excitation of individual elements of the array. Receive beam focusing and steering is similarly controlled by delaying and then combining signals from the individual elements. In both cases the excitation signal delays are conventionally controlled by time delay elements as shown for instance in FIGS. 3 and 4 of U.S. Pat. No. 3,936,791 (Kossoff). A similar drawing of a complete aperture of delay lines is shown in FIG. 1 of U.S. Pat. No. 4,542,653 (Liu). As these drawings show, linear delay variation across the array aperture may be used to steer an acoustic beam, on transmit or receive, in a direction orthogonal to the line of delay variation. A quadratic variation across the aperture may be used to focus the beam on transmit or during reception. In a practical beamformer the two variations are usually combined into a single delay structure for each element which embodies both variations, and an array of such delay structures will hence both steer and focus a transmitted or received beam. During transmission the acoustic energy from individual transducer elements is acoustically combined into a focused beam which is projected in a predetermined direction in the image field. During reception the delayed signals from the transducer elements are electronically combined to form a focused signal which has been received from the predetermined direction.

The straightforward expansion of the Kossoff or Liu beamformer into a beamformer capable of receiving multiple lines simultaneously is accomplished by replicating its delay structures. A second line can be simultaneously received by adding a second, parallel set of delay structures across the aperture and a second summing circuit. This is essentially a doubling of the receiving circuitry of the beamformer.

Referring now to FIG. 1, an array 10 of ultrasonic transducers is shown with an image field in front of the array. The array 10 comprises n transducer elements, certain ones of which are labeled beginning with $T_1$ and ending with $T_n$. The beamformer which controls the array 10 in this example operates to cause the array to transmit a beam of ultrasonic energy along pairs of adjacent scan lines. Two such scan lines, $L_A$ and $L_B$, are shown in the drawing. The beamformer can be controlled as taught in U.S. Pat. No. 4,644,795 (Augustine) to cause the array to steer a transmit beam with a flat mainlobe response and steep skirts which encompasses the scanlines $L_A$ and $L_B$. It is desirable for uniformity of response that the two scanlines be equally and uniformly insonified. As acoustic energy propagates along the two scanlines, echoes are returned from structures and interfaces located along the scanlines.

In the example of FIG. 1 it is assumed that there are structures at points $P_A$ and $P_B$ on the two scanlines which are insonified by the same transmit sequence and reflect echoes back to the array for reception. The echoes returned from the two points will be characterized by two expanding wavefronts. The two wavefronts are shown at a particular point in time by the radial arcs $r_A$ and $r_B$ which radiate from points $P_A$ and $P_B$. Certain components of the wavefront are directed toward and will eventually be received by certain elements of the array. Wave component $e_{AC}$ travels along vector BC from point $P_A$ and will be received by the center transducer element $T_C$. Wave component $e_{BC}$ travels along vector BC from point $P_B$ and will also be received by the center transducer element $T_C$. Since the distances traveled by these two wave components, vectors AC and BC, are the same, these two wave components will be received by the center transducer element $T_C$ at the same time.

A somewhat different result is obtained for the wave components $e_{Aj}$ and $e_{Bj}$ directed to transducer element $T_j$. These wave components travel along vectors Aj and Bj and, due to the angle of inclination of these vectors relative to the face of the array and the lateral displacement of points $P_A$ and $P_B$, vector Aj is slightly longer than vector Bj. At the time that wave component $e_{Aj}$ intersects the radial arc $r_A$, the wave component $e_{Bj}$ is leading and intersects radial arc $r_B$. This disparity results in reception of the leading wave component $e_{Bj}$ by transducer element $T_j$ just slightly ahead of reception of wave component $e_{Aj}$.

The leading nature of the wave component from point $P_B$ becomes even more pronounced at the outermost transducer element $T_n$. Vector An is even longer than vector Bn, even more so than was the case of the previous vectors, as shown by the spacing between arcs $r_A$ and $r_B$ where the arcs intersect vectors An and Bn. Wave component $e_{Bn}$ will lead wave component $e_{An}$ by an even greater margin than was true for the other wave components and will arrive at transducer element $T_n$ with an even greater phase lead in relation to wave component $e_{An}$.

For transducer elements symmetrically disposed on the other side of the center element, such as $T_i$ and $T_1$, a complementary situation obtains. It is seen that on this side of the center element the arc $r_A$ leads arc $r_B$. This means that wave components arriving at correspondingly spaced transducers will exhibit the same magnitude of phase disparity, but the leading component will now be the lagging component. On the right side of the aperture the B components were leading the A components. But on the left side of the aperture the A components will lead the B components.

FIG. 2 is an enlarged view of the wave components received on the right side of the aperture. The components are drawn on a time line with the earliest times to the left, illustrating the relative phasing of components arriving at the same transducer element and from element to element. The time line starts from a reference time t=0, which marks the time of production of the transmitted wave. The dots drawn on the single cycle wave components represent sampling of the wave components at uniformly spaced 90° intervals. If the wave components were 2.5 MHz pulses, for instance, they would be sampled every 0.1 μsec. In the notation adopted for this example, the first sample of each wave component is identified with the subscript "1", the second sample with a subscript "2", and so forth.

Since the echo components from points $P_A$ and $P_B$ arrive at the center element $T_C$ at the same time (in phase), the first waveform to the right of the time reference represents both echo components $e_{AC}$ and $e_{BC}$. Sampling the echoes at the first dot yields the first sample value for both echoes, shown as $A_1$ and $B_1$. Sampling at the second dot also yields two identical second samples shown as $A_2$ and $B_2$.

In the center of the drawing echo component $e_{Bj}$ is seen to be slightly leading echo component $e_{Aj}$ in phase. As the dots show, different sampling times are used for the two separate echo components. The first two sampling times yield sample values $B_1$ and $A_1$ from the two components. A short time later the next two sampling times yield sample values $B_2$ and $A_2$.

At the right of the drawing echo component $e_{Bn}$ is seen to be significantly leading echo component $e_{An}$. The relative phase disparity is so great that the leading echo component $e_{Bn}$ is sampled twice before the lagging $e_{An}$ component is sampled. Thus, the first two sampling times yield sample values $B_1$ and $B_2$ before the $A_1$ sample is obtained from the lagging echo component $e_{An}$. Thereafter the sampling pattern will alternate between the A and B components. That is, the $A_1$ sample value is succeeded by a $B_3$ sample, then an $A_2$ sample, and so forth.

A beamformer utilizing the relationships illustrated in FIGS. 1 and 2 in accordance with the principles of the present invention is shown in FIGS. 3a and 3b. Unlike conventional beamformers, the beamformer of these drawings utilizes no delay structures to form coherently summed signals. Transducer array 10, including transducer elements $T_1$ through $T_n$, is shown at the left of FIG. 3a. Each transducer element is coupled to a sampling circuit 12. The sampling circuits 12 are controlled to begin interleaved sampling of echo signal components received by each transducer element upon the arrival of the first echo signal component from a line by each transducer element. A number of these signal components are shown in the sequence in which they are received, with the earliest received signals to the right, at the outputs of five of the sampling circuits. The illustrated sample sequences are spaced horizontally to represent their relative times of reception by the transducer elements. For instance, the first two samples received are the sample values identified as $A_1$ and $B_1$ from the central transducer element $T_C$. As FIG. 2 showed, these are in actuality one sample which has been identified by two labels. This pair of samples is succeeded by samples $A_2$ and $B_2$; $A_3$ and $B_3$; and $A_4$ and $B_4$. This comprises a full set of eight samples from the sampling of a full cycle of both wave components.

The next of the illustrated sampling circuits to begin producing sample values are those coupled to transducer elements $T_i$ and $T_j$. Since the two beams $L_A$ and $L_B$ are symmetrically disposed about an axis 16 which is orthogonal to the face of the linear transducer array, these two transducer elements will begin producing sample values at the same time. If the beams were both steered to the right or left of this central axis, the element on the side to which the beams were steered would begin to receive echo components first. If the array were curved instead of linear, initial times of reception of the outer elements would be advanced or delayed depending upon whether the curvature is convex or concave. It is seen in the example of FIG. 3a that the $T_i$ element will begin its alternating sequence with an $A_1$ sample while the $T_j$ element will begin its alternating sequence with a $B_1$ sample. Eight successive sample values from the sampling of a full cycle of both wave components are shown.

In a similar manner, echo components are thereafter received by the outer transducer elements $T_1$ and $T_n$ and are sampled by the sampling circuits. As FIG. 2 revealed, these sample sequences are preceded by two samples from the same line before the samples alternate between lines. In the case of element $T_1$, samples $A_1$ and $A_2$ are produced before the first B sample, $B_1$, appears. On the opposite side of the aperture, B line samples $B_1$ and $B_2$ are produced before the first A line sample, $A_1$, appears. After the initial pair of samples from the same line, the A and B samples alternate on both sides of the aperture, but in reverse order as shown.

The sampling circuit outputs are coupled to the inputs of multiplexers 14 which receive the sequences of sample values. The purpose of the multiplexers is to direct the A and B samples to distinct locations where the samples can be grouped for coherent signal summing. In the present example the multiplexers 14 direct the sample values to accumulators shown in FIG. 3b. The sample values of echo signals from point $P_A$ are stored in accumulator 18A, and the sample values of echo signals from point $P_B$ are stored in accumulator 18B. For clarity of illustration the samples are identified by two subscripts, the first identifying the transducer from which the sample was acquired and the second the sampling order. These accumulated matrices of values will fill up in the order in which the various sample values are received. For instance, the first values to be accumulated in the matrices are the $A_{C1}$ and $B_{C1}$ values first received by the center element $T_C$. The matrices will continue to be filled with sample values until the last received sample values $A_{n4}$ and $B_{n4}$ are entered.

When all of the echo components returned from a common wavefront emanating from points $P_A$ and $P_B$ have been received and their corresponding sample values entered in the accumulators, the sample values are summed by summing circuits 19A and 19B to form coherent samples of the respective echoes: A1, A2, A3, and A4 for point $P_A$, and B1, B2, B3, and B4 for point $P_B$. Summed sample A1 is developed by summing the samples vertically aligned in the rightmost column of accumulator 18A, including samples $A_{11}$ through $A_{n1}$. Summed sample $A_2$ is developed by summing samples $A_{12}$ through $A_{n2}$ of the next column of the accumulator 18A. Similar summation produces the other illustrated summed samples. These summed signal sample values can then be processed as known in the art to form an image of echo amplitude information or various forms of Doppler flow velocity information. It is thus seen that coherent ultrasonic echo information values are formed for two spatial lines simultaneously without the need for delay lines or similar conventional circuitry.

A detailed schematic diagram of a beamformer channel constructed in accordance with the principles of the present invention is shown in FIG. 4. The illustrated channel and others in the beamformer are operated under control of a central controller 30. The central controller coordinates the timing of operation of all beamformer channels for the transmission, focusing, steering, and reception of ultrasonic beams and echo information. The timing of all operations is based upon the clock pulses of a high frequency master clock 32. Using this master clock as a time base, the central controller controls the times at which the channel's transducer element Tr is pulsed by transmit circuitry 50 to transmit ultrasonic waves, and also controls the reception circuitry which will now be described.

When echo signals are received by the transducer element Tr, they are converted to digital words by an analog to digital (A/D) converter 20. Received signals are converted into digital words at the times of application of sampling pulses from OR gate 22. The digital words are coupled to multiplexer 14 which operates as previously described to steer the digital words from the multiple lines to either memory area A or memory area B of a storage devices 24, where they are stored together with samples from other channels. When all of the samples necessary to form a coherent signal value have been collected in an area of the storage device, the samples of that area are coupled to an adder 19A or 19B which sums the sample values to create coherent echo signal sample values for one of the lines A or B. The echo signal sample values are then coupled by a data bus 25 to a scan converter where they are processed into an image for display, or the echo signal sample values may be sent to a Doppler processor for processing. The central controller tracks the sample values as they pass through the channel and are accumulated and summed so that locational information can be associated with the summed echo signal samples for processing and display of the echo information on a spatial basis.

Timing pulses illustrating the operation of the sampling and multiplexing functions of the channel are shown in FIGS. 5a–5c. FIG. 5a illustrates the pulses used to sample echoes received by the transducer element from one line, FIG. 5b illustrates the pulses used to sample the other line, and FIG. 5c is a combination of both sets of sampling pulses. Each pulse sequence is preceded by a time period $t_{d1}$ or $t_{d2}$ which is the delay time before the transducer begins to receive echoes. These time delays can be computed or looked up by the central controller from foreknowledge of the position of the transducer element in the array and the steering angles and locations of the scanlines. The delays are measured by counting pulses of the master clock 32 from a known time reference such as the nominal pulse transmit time. When the shorter of these initial time periods has been counted by the central controller, counters 28 produce an output pulse and then begin counting periods between sampling pulses. As FIG. 5c shows, after an interval $t_{d1}$, the shorter of the initial time periods, a pulse is produced and a counter counts master clock pulses to measure the passage of the first interpulse period $t_a$. When this period $t_a$ has been counted an output pulse is produced and a second counter begins to count a second interval $t_b$. At the end of the second interval another output pulse is produced and the first counter begins counting the first interval $t_a$ again. The initial output pulse and the pulses produced by the second counter are applied to the multiplexer 14 and to one input of OR gate 22. These are sampling pulses and steering (multiplexing) signals for one of the multiple lines, the one closest to the transducer element. The output pulses produced by the first counter are coupled to the multiplexer 14 and another input of the OR gate 22 as sampling and steering pulses for the other line. Thus, the pulses shown in FIG. 5a are produced at one output of the counters 28, the pulses shown in FIG. 5b are produced at the other output, and the pulses shown in FIG. 5c are produced at the output of the OR gate 22 to sample and control the steering of the echo signal components received from the multiple scanlines.

In the special case of the most lateral transducer elements such as $T_1$ and $T_n$, where the second echo component lags the first by a time period greater than the echo sampling interval, the central controller must recognize this condition and control the interleaved sampling sequence accordingly. This could be accomplished by inhibiting production of the sampling pulse at the end of interval $t_a$, for instance, until reception of the second echo commences.

The pulses of FIG. 5c will cause the A/D converter to sample the arriving echo signal components from multiple lines. After the first sample or the first few samples, the sequence of samples produced by the A/D converter will alternate between the multiple lines. The signals coupled from the counters to the multiplexer 14 identify the relation between the samples and the multiple lines, causing the multiplexer to steer the samples to the respective storage areas for each line. When all of the samples from a common phase of an echo wave have been accumulated in the storage area they are summed to provide a coherent signal sample for that echo. The summed echo signal samples, together with their positional information, are then processed in the normal manner.

It will be appreciated that the relationship between the interleaved pulses of FIG. 5c will be dependent upon a number of factors, including the point of origin or points of origin of the multiple scan lines, the directions in which the scan lines are steered, and the position of the specific transducer element along the array. The scanlines may all originate from one point on the face of the array as do scanlines $L_A$ and $L_B$ of the preceding examples, or may originate from behind the array as shown in my U.S. Pat. No. 5,123,415, or may extend in parallel from the face of the array. For reception of multiple lines by the central transducer element as shown in FIG. 2, where the echoes from the multiple lines are in phase, interval $t_b$ in FIG. 5c will be zero and FIG. 5c will look like the pulse train of FIG. 5a. For transducer elements at the edges of the array, such as elements $T_1$ and $T_n$, the repeat of samples from the same line must be accounted for before the samples recur in their regularly interleaved sequence.

Echo signal components will, as is customary, be received from the near field first, then progressively from increasing depths of field. As echoes are received from increasing depths the aperture may change as additional elements are added. In addition, as echoes are received from increasing depths of field the relative phase relationships between the wave components received by the numerous transducer elements will be continually changing. To maintain all received signal components in focus, compensation should be made for these changing phase relationships. This can be done in the embodiment of FIG. 4 by commands from the central controlled which periodically cause the relative phase relationships of the sampling signals then being produced for the different channels to become realigned. Such phase realignment with depth enables continuous and accurate dynamic focusing of the multiple received lines of echo information.

It will be appreciated that, whereas the embodiment of FIG. 4 shows the use of separate adders 19A and 19B for each separate spatial line $L_A$ and $L_B$, a single adder can be used in a time multiplexed manner. When all samples have been acquired to form a coherent signal for one line the samples for that line can be directed to the single adder, summed, and directed to the appropriate subsequent processor. Thereafter a group of samples for the other line can be directed to the adder, summed, and processed. In this way optimization of tradeoffs of hardware, speed and signal paths can be attained.

While the preceding examples have illustrated the formation of two receive lines from a single transmitted beam, it will be appreciated that three, four, or even more multiple lines can be received from a single transmission. Reception of additional lines is accomplished by interleaving additional, appropriately phased sampling pulses in FIG. 5c which may be provided by additional counters in counters 28 of FIG. 4. The storage device is correspondingly expanded to store the simultaneously received line information, and the multiplexer controlled to steer the signal samples to the appropriate storage areas. The transmit pulses should be carefully controlled to provide the desired lateral resolution for the simultaneously received lines. The present invention will thereby enable the receipt of lines for a full image in a fraction of the time utilized by systems which receive only one line per transmit beam, providing greater flexibility in the frame rate of display.

What is claimed is:

1. An ultrasonic diagnostic system for receiving multiple lines of ultrasonic energy using an array of transducer elements comprising:

means for transmitting ultrasonic energy which insonifies the locations of two or more spatially distinct lines in a spatial field being interrogated;

means for forming two or more sequences of echo information from said lines from echoes received by elements of said array, including means for sampling the signals received by individual ones of said elements, each at sampling times comprising two or more interleaved sequences of sampling signal phase relationships related to the phases of signals of said two or more receive lines which are to be received by that individual element to produce a sequence of signal samples; and means, responsive to said sampling means, for separately summing the signal samples produced by each of said sampling signal phase relationships to form coherent signals of two or more receive lines, wherein the relative delays of said signal samples enabling the formation of coherent signals of said two or more receive lines are provided by said sampling times of said sampling means.

2. The ultrasonic diagnostic system of claim 1, wherein said means for sampling comprise analog to digital converters; and wherein said separately summing means further comprises storage means, responsive to said sampling means, for storing said signal samples in relation to each sampling signal phase.

3. The ultrasonic diagnostic system of claim 2, further comprising signal sample steering means responsive to said signal samples for steering signal samples of a given sampling signal phase relationship to said separately summing means.

4. The ultrasonic diagnostic system of claim 3, wherein said signal sample steering means directs signal samples of a given sampling signal phase relationship to a predetermined area of said storage means.

5. The ultrasonic diagnostic system of claim 3, wherein said separately summing means comprises a plurality of separate summing means for producing coherent signals for separate receive lines, and wherein said signal sample steering means directs signal samples of a given sampling signal phase relationship to one of said summing means in correspondence with a given receive line.

6. The ultrasonic diagnostic system of claim 3, wherein said signal sample steering means directs signal samples of each of said sampling signal phase relationships to said summing means in a time interleaved sequence.

7. An ultrasonic diagnostic system for transmitting and receiving beams of ultrasonic energy by an array of transducer elements comprising:

means for actuating a plurality of transducer elements at respective predetermined times to transmit a beam of ultrasonic energy which insonifies the locations of two or more spatial receive lines; and means for forming sequences of coherent echo signals received from said receive lines, including a plurality of sampling means, each coupled to a respective one of said array elements, each for sampling the signals received by an array element at sampling times comprising two or more interleaved sequences of sampling signal phase relationships related to the expected times of reception of echo signals received from said receive lines;

storage means including a plurality of storage areas;

means, responsive to signal samples produced by said sampling means, for directing signal samples to storage areas identified with said receive lines;

means coupled to said storage means for determining when a set of signal samples necessary to form a coherent signal of a receive line has been received; and means responsive to said determining means for summing sets of relatively delayed signal samples to form coherent signals of two or more receive lines;

wherein the relative delays of said summed sets of signal samples are provided by said sampling times.

8. The ultrasonic diagnostic system of claim 7, wherein said sampling means comprise analog to digital converters; and further comprising control means, coupled to said sampling means, for initiating signal sampling at a time corresponding to the anticipated time of arrival of the first one of said echo signals desired to be sampled.

9. The ultrasonic diagnostic system of claim 8, wherein said sampling signal phase relationships of said sampling means alternately acquire samples of different receive lines.

10. The ultrasonic diagnostic system of claim 9, wherein said alternate acquisition of samples of different receive lines is preceded by the consecutive acquisition of samples of the same receive line when signals from two receive lines are expected to exhibit a lagging phase relationship to each other which exceeds the sampling interval of said first one of said echo signals.

11. An ultrasonic diagnostic system for transmitting and receiving beams of ultrasonic energy using an array of transducer elements comprising:

means for exciting individual elements of said array at different times during a transmit sequence to transmit a steered and focused beam of ultrasonic energy which insonifies two vectors along which ultrasonic echoes are to be received and processed;

a plurality of sampling circuits, each of which has a control input to which sampling pulses are applied, a signal input coupled to a respective transducer element to sample echo information signals received by that element, and a signal output; and sampling pulse producing means, coupled to the control input of each of said sampling circuits, for producing at each control input a first sequence of sampling pulses in predetermined phase relationship to echo information signals expected to be received by said respective transducer element from along said first vector, and a second sequence of sampling pulses, interleaved in time with said first sequence, and in a predetermined phase relationship to echo information signals expected to be received by said respective transducer element from along said second vector, wherein an interleaved sequence of signal samples from along said first and second vectors and relatively delayed from one signal output to another is produced at said signal outputs.

12. The ultrasonic diagnostic system of claim 11, wherein said sampling pulse producing means includes means for inhibiting the production of sampling pulses until the anticipated time of arrival at said transducer element of echo information signals desired to be received from along said first vector.

13. The ultrasonic diagnostic system of claim 12, wherein said inhibiting means includes means for inhibiting the production of said second sequence of sampling pulses until two pulses of said first sequence have been produced.

14. The ultrasonic diagnostic system of claim 11, further comprising means, coupled to said signal outputs of said sampling circuits, for separately summing signal samples produced by said sampling circuits in response to each of said sampling pulse sequences.

15. The ultrasonic diagnostic system of claim 14, further comprising storage means for storing samples produced by said sampling sequences in correspondence to each of said first and second sequences, wherein said means for separately summing sums stored samples resulting from said first sequences, and separately sums stored samples resulting from said second sequences for the production of coherent signal samples from each of said vectors.

16. An ultrasonic array system for transmitting pulses of ultrasonic energy into an interrogation field and receiving echo information signals from along a plurality of spatially different vectors extending in said field comprising:

an array of ultrasonic transducer elements;

means for actuating elements of said array to transmit a pulse of ultrasonic energy along two of said vectors in said field; and a plurality of receivers, coupled to said array, and each receiver comprising:

a sampling circuit having a signal input coupled to a transducer element to receive echo information signals received by said transducer element from along two or more vectors following a transmit pulse, a control input and a signal output at which digital signal samples are produced;

sampling pulse generating means, coupled to a control input of said sampling circuit, for sampling said echo information signals to produce a first sequence of digital signal samples in a predetermined phase relationship to echo information signals expected to be received from along a first vector and at times delayed from the timing of said actuating means in relation to the times at which other receivers sample first vector echo information signals;

sampling pulse generating means, coupled to a control input of said sampling circuit, for sampling said echo information signals to produce a second sequence of signal samples, interleaved in time with said first sequence, and in a predetermined phase relationship to echo information signals expected to be received from along a second vector and at times delayed from the timing of said actuating means in relation to the times at which other receivers sample second vector echo information signals; and means, coupled to the signal outputs of a plurality of said sampling circuits, for accumulating said sequences of signal samples as a function of the vector with which they are associated.

17. The ultrasonic diagnostic system of claim 16, further comprising summing means, coupled to said accumulating means, for separately summing signal samples associated with each of said vectors.

18. The ultrasonic diagnostic system of claim 17, wherein each receiver further includes sampling pulse inhibiting means, coupled to said sampling pulse generating means, for inhibiting the sampling of said echo information signals until the anticipated time of arrival at said signal input of a desired echo information signal from said first vector.

19. The ultrasonic diagnostic system of claim 18, wherein said sampling pulse inhibiting means further includes means for inhibiting the sampling of said echo information signals to produce a second sequence of signal samples until a time following the production of said first sequence of signal samples which is dependent upon the anticipated time by which the time of receipt of signals from said second vector is delayed with respect to the time of receipt of signals from said first vector.

20. An ultrasonic array system including a digital beamformer for producing coherent echo signals from along two laterally separate receive lines extending from an array of ultrasonic transducer elements in response to the transmission of one pulse of ultrasonic energy along said receive lines, said beamformer comprising:

a plurality of analog to digital converters, coupled to said transducer elements and responsive to echoes produced along both receive lines for producing digital signal samples of both receive lines at times relatively delayed from one converter to another for coherent summing;

sorting means for sorting said digital signal samples as a function of the receive line with which they are associated and their delay along each line; and means for summing said sorted digital signal samples to produce coherent digital signals of both receive lines.

21. An ultrasonic array system including a digital beamformer for producing coherent echo signals from along two laterally separate receive lines extending from an array of ultrasonic transducer elements in response to the transmission of one pulse of ultrasonic energy along said receive lines, said beamformer comprising:

a plurality of analog to digital converters, each having a control input at which sample time control signals are applied, coupled to a transducer element, and responsive to echoes produced along both receive lines for producing two sequential digital signal samples of different receive lines at sample times relatively delayed from one converter to another for coherent summing;

means for sorting said digital signal samples into a first set of digital signal samples relating to each of said analog to digital converters and one of said receive lines, and into a second set of digital signal samples relating to each of said analog to digital converters and the other of said receive lines;

means for summing each set of digital signal samples to form two coherent signals, each from a different receive line, wherein the relative delay of the digital signal samples of each set is provided by said sample time control signals for coherent summing.

22. An ultrasonic array system including a digital beamformer for producing, in response to the transmission of one pulse of ultrasonic energy, coherent echo signals from along two laterally separate receive lines extending from an array of ultrasonic transducer elements, said beamformer comprising:

a plurality of analog to digital converters having sample time control inputs, inputs coupled to receive echo signals from said array of ultrasonic transducer elements, and outputs at which digital signal samples are produced;

means for sorting said digital signal samples from said converters in relation to said two receive lines;

means for summing said sorted digital signal samples to form coherent signals of both of said receive lines; and means for providing the relative delays for coherent summing of said digital signal samples, comprising means for applying sample time control signals exhibiting timing related to the coherence of signal samples of both receive lines to said sample time control inputs of said analog to digital converters.

23. An ultrasonic array system including a digital beamformer for producing, in response to the transmission of one pulse of ultrasonic energy, coherent echo signals from along two laterally separate receive lines extending from an array of ultrasonic transducer elements, said beamformer comprising:

a plurality of analog to digital (A/D) converters each having a signal input coupled to a transducer element, a control input at which sampling time control signals are applied, and an output at which digital signals are produced;

a sampling time control signal generator, coupled to said control inputs of said A/D converters and comprising means for imparting relative delays to digital signals so that they can be coherently summed; and means for sorting alternate ones of said digital signals produced by said A/D converters into groups of digital signals which, by reason of said relative delays, can be coherently summed to form coherent digital signals of said two receive lines.

24. The ultrasonic array system of claim 23, wherein said digital signals produced by each of said A/D converters comprise digital signals of both of said receive lines produced in an interleaved sequence.

25. The ultrasonic array system of claim 23, wherein said sorting means sorts said digital signals without altering the relative delays of digital signals which are to be coherently summed together.

* * * * *